UNITED STATES PATENT OFFICE.

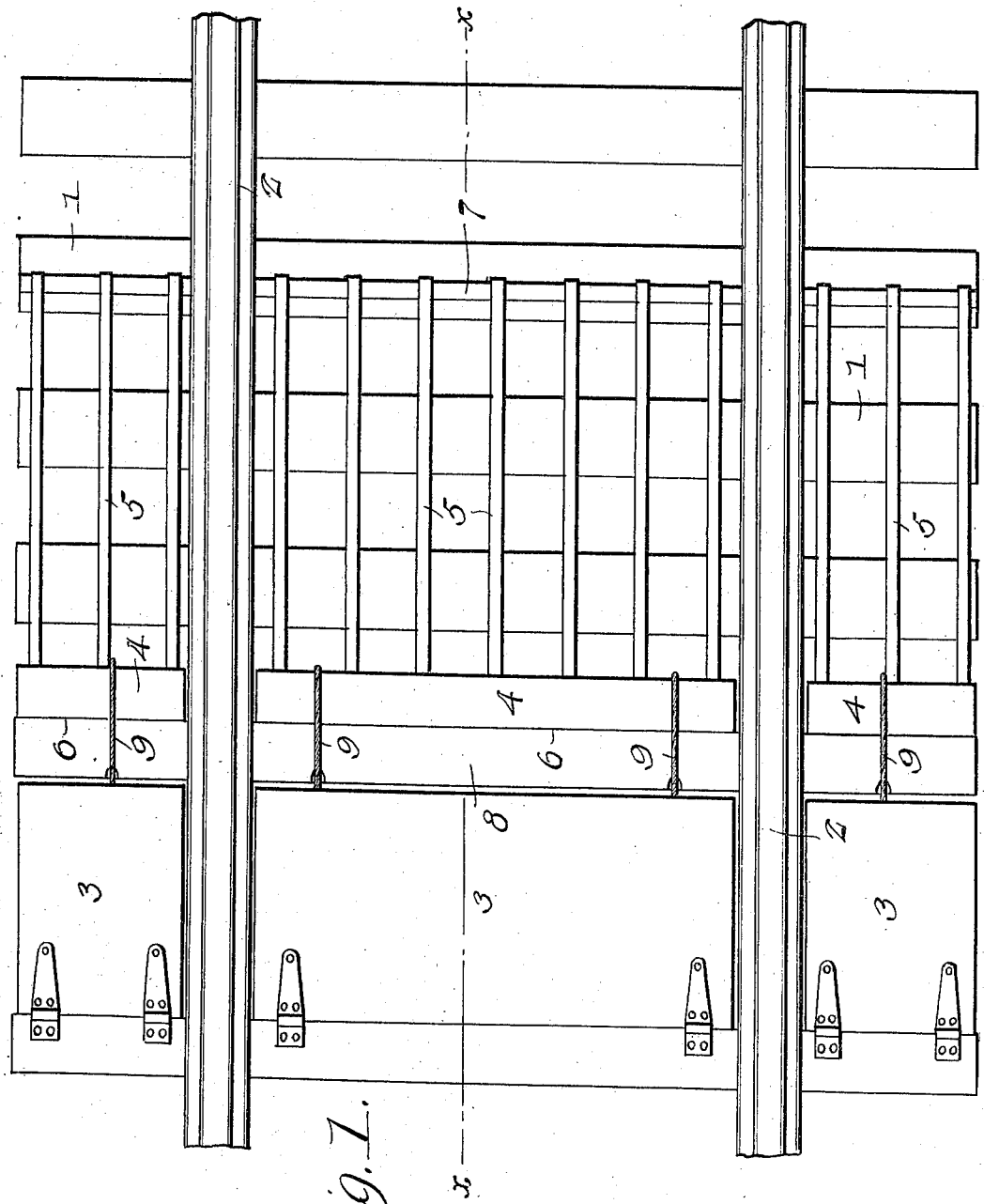

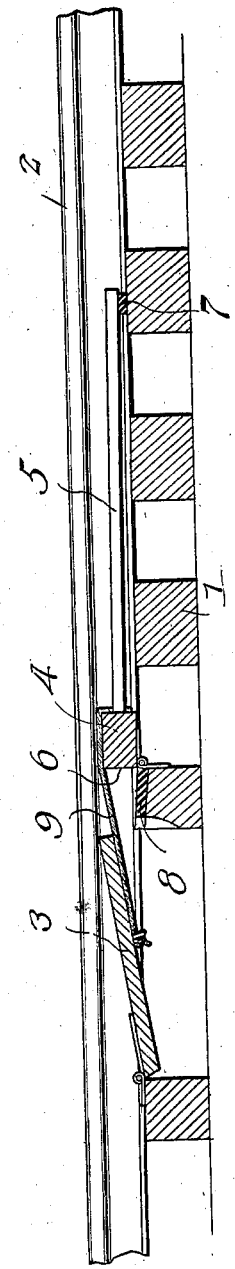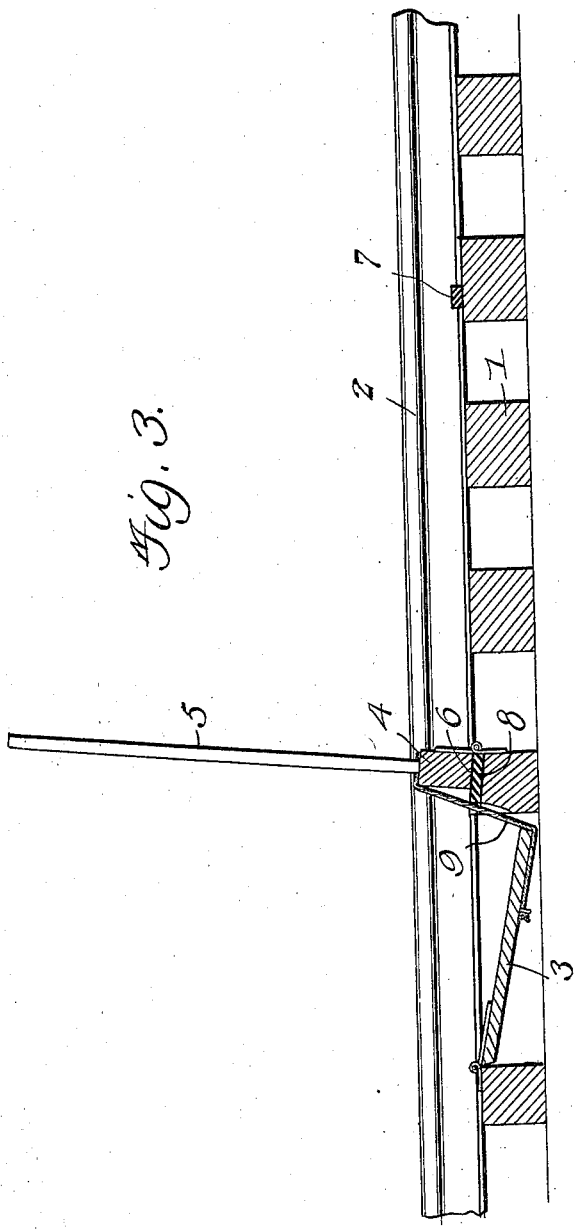

DANIEL GRANT, OF HAMILTON, MONTANA, ASSIGNOR, BY DIRECT AND MESNE ASSIGNMENTS, OF THIRTY-TWO AND ONE-THIRD ONE-HUNDREDTHS TO PEARL REMINGTON, OF HAMILTON, MONTANA, AND THIRTY-THREE AND ONE-THIRD ONE-HUNDREDTHS TO EDWARD HOFFENBRODEL, OF BUTTE, MONTANA.

CATTLE-GUARD.

1,090,979. Specification of Letters Patent. Patented Mar. 24, 1914.

Application filed January 10, 1913. Serial No. 741,254.

*To all whom it may concern:*

Be it known that I, DANIEL GRANT, a citizen of the United States, residing at Hamilton, in the county of Ravalli and State of Montana, have invented new and useful Improvements in Cattle-Guards, of which the following is a specification.

The invention relates most especially to protective means for preventing cattle leaving a roadway or crossing when passing over a railroad track and following the latter, and consists chiefly of a hinged guard which normally lies upon the road bed of the track so as to be out of the way of a passing train and which is automatically elevated by the weight of an animal when attempting to follow the track, thereby presenting a barrier to hinder the animal from leaving the crossing and passing along the line of railway.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a top plan view of a cattle guard for railways embodying the invention. Fig. 2 is a section on the line *x—x* of Fig. 1. Fig. 3 is a view similar to Fig. 2 showing the guard elevated.

Corresponding and like parts are referred to in the following description, and indicated in all the views of the drawings, by the same reference characters.

The invention is adapted to be applied to railways generally and comprises a platform adapted to sustain the weight of the animal and a gate mounted to normally rest upon the road bed so as to be out of the way and having connection with the platform to be elevated thereby when the platform is depressed by the weight of the animal imposed thereon.

The railway illustrated is of ordinary construction and comprises ties 1 and rails 2. A guard is located between the rails and at each side of the track, each of the guards being of like construction, hence a detailed description of one will suffice for a clear understanding of the invention. The platform 3 is hinged at one edge to one of the ties 1 and is free to swing at its opposite edge in a vertical direction. The platform of the middle guard is of a length to extend between the rails 2 and of a width to fill the space between adjacent ties. The platform may be of any construction and hinged to the tie in any manner.

The gate or guard proper may be of any form to present a barrier to hinder an animal from passing along the line of railway. In the construction illustrated the gate consists of a header 4 and a plurality of rods or bars 5 extending therefrom. These parts may be of any material. The gate is hingedly connected to the tie adjacent the free edge of the platform and the face 6 of the header 4 adapted to abut against the top side of the tie to which the gate is hinged is inclined in such a direction as to prevent the gate assuming a vertical position, thereby preventing it remaining on a dead center and failing to close after the platform has been relieved of the weight of the animal. The gate closes automatically by its own weight and at the same time raises the platform slightly at its free edge. A buffer 7 is provided upon the top side of the tie near the one to which the gate is hinged and receives the impact of the gate when lowering, thereby cushioning the blow. A cushion 8 is interposed between the gate and the tie to which the gate is hinged and serves the dual purpose of relieving shock incident to the sudden elevation of the gate and to act as means for initially starting the gate when lowering after the platform has been relieved of the weight of the animal. The cushion 8 also serves in a measure to prevent overstraining of the hinge connections between the platform and gate and the ties to which they are connected. Flexible connections 9 are interposed between the gate and platform and are so arranged that when the free edge of the platform is depressed the gate is caused to assume an upright position. The connections 9 may consist of wire rope or chain, one end being attached to the platform and the opposite end being secured to the header 4 and passing upwardly thereover so that when the platform is depressed a pull upon the flexible connections 9 causes a swinging of the gate from a horizontal to an approximately vertical position.

When the invention is installed on a line of railway the platform and gate occupy such relative positions as not to interfere with the free passage of trains, but when an animal attempts to leave the road or crossing and steps upon the platform the same is depressed and the gate elevated, thereby offering an obstruction to prevent the animal continuing along the line of railway. It is to be understood that both sides of the roadway or crossing are similarly equipped and that the guards at the sides of the track may be of any length to extend to the inclosures.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:

A cattle guard for railways comprising a depressible platform, a gate forming a counterbalance for the platform to hold it elevated and mounted to swing toward and from a vertical plane, a buffer arranged to come between the hinged end of the gate and the part to which such gate is hinged and serving as cushioning means as well as providing a stop to limit the movement of the gate to prevent it reaching and stopping on a dead center, and connecting means between the gate and platform to cause both to move in unison.

In testimony whereof I affix my signature in presence of two witnesses.

DANIEL GRANT.

Witnesses:
M. F. GUINON,
C. B. OERTLI.

---

Copies of this patent may be obtained for five cents each, by addressing the "Commissioner of Patents, Washington, D. C."